G. W. WEBB.
BELT.
APPLICATION FILED DEC. 2, 1916.
1,258,067.
Patented Mar. 5, 1918.
Fig. I.
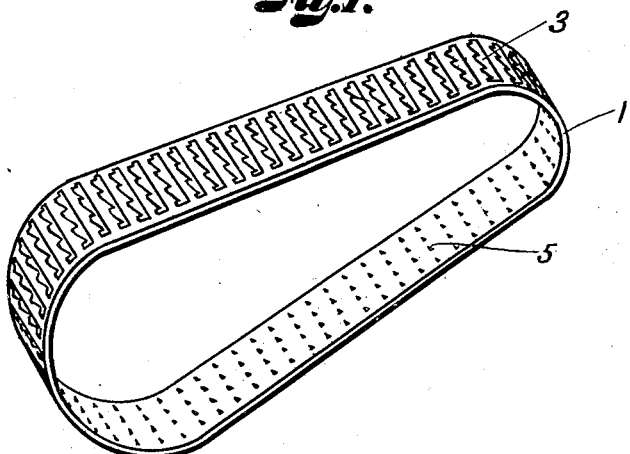
Fig. II.
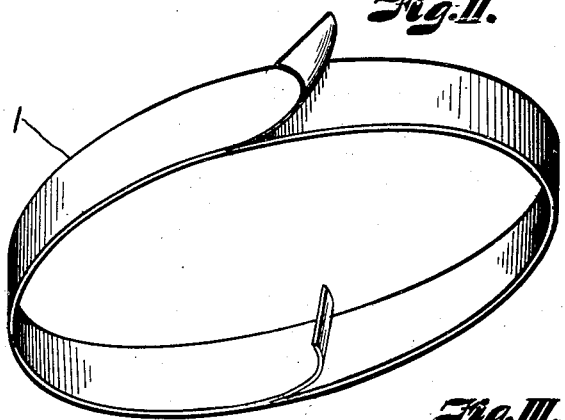
Fig. III.
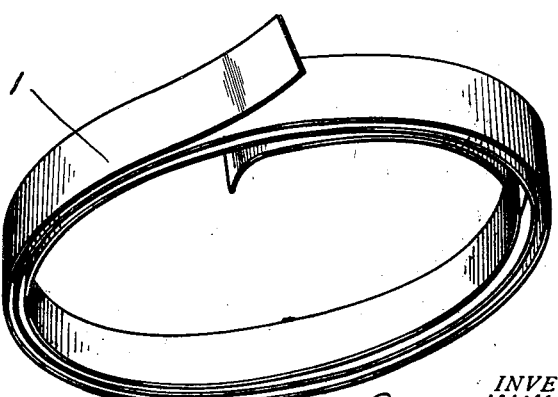
Fig. IV.
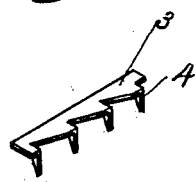
INVENTOR.
George W. Webb.
BY Arthur C. Brown
ATTORNEY

UNITED STATES PATENT OFFICE.

GEORGE W. WEBB, OF JOHNSON COUNTY, KANSAS, ASSIGNOR TO WEBB BROTHERS BELTING COMPANY, OF KANSAS CITY, MISSOURI, A CORPORATION OF MISSOURI.

BELT.

1,258,067.  Specification of Letters Patent.  Patented Mar. 5, 1918.

Application filed December 2, 1916. Serial No. 134,764.

*To all whom it may concern:*

Be it known that I, GEORGE W. WEBB, a citizen of the United States, residing in the county of Johnson and State of Kansas, have invented certain new and useful Improvements in Belts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to belts, and more particularly to a fan belt for vehicle motors.

It is a well known fact that mineral oil which is ordinarily used for lubricating purposes has a deteriorating effect upon rubber, canvas and leather, the materials of which belts are ordinarily constructed, so that a belt subject to contact with the oil must be renewed at frequent intervals and is undependable because of its constant liability to breakage. In order, therefore, to provide a belt which can resist the attack of such oil and have some permanency, I have provided the present improvement, the preferred form of which is illustrated in the accompanying drawings, wherein:

Figure I is a perspective view of a belt constructed according to my invention.

Fig. II is a similar view showing the belt without its armor and with the ends of the belt material turned back to indicate the construction.

Fig. III is a similar view, showing the plies of the belt spaced to better illustrate my construction.

Fig. IV is a detail perspective view of one of the armor plates.

Referring more in detail to the drawings:—

1 designates a belt body which is preferably composed of cotton or the like, originally formed in a strip of substantial length and of the width of the completed belt, and wound upon itself to form a plurality of plies from the single strip, this construction providing a continuous belt having intervening plies between the free ends that will obviate separation of the belt at any particular point owing to the absence of a joint, it being apparent that as the plies are wound as described, one end of the strip will lie at the inside of the belt and the other end at the outside, and that the ends need not necessarily terminate in the same transverse line although such arrangement is preferably in order to give the belt the same thickness at all points. The material of which the body 1 is formed may be suitably treated to cause the plies to adhere to each other and form a substantial integral structure and to hold the ends of the strip to the body part, the connection of the plies being supplemented by the fastening portions of the anchor plates as hereinafter described, although such supplemental connection is not essential.

Secured to the outer surface of the belt in such close relation as to cover the greatest possible surface area thereof without interfering with its flexibility, are plates 3, preferably of the construction illustrated in Fig. I, and in detail in Fig. IV, this construction comprising rectangular body portions of such length that they will extend across the belt and having teeth 4 projecting from one edge thereof and of such length that they will penetrate the belt and project from its inner face, so that the projected points may be bent over and form the clencher fastenings 5 at the inside of the belt. These plates are placed as closely as possible together, in order to cover the greatest possible surface area of the belt and protect the same against contact with drops of oil which may drop or be thrown onto the belt, the metal of which the plates are constructed being impervious to the oil and serving to throw the same away from the belt during the travel of the latter.

It is apparent that a belt of this construction may be used to advantage for operating the motor fans in automobiles and for other locations where the belt is subject to contact with oil, and that the belt when so constructed is much more durable for the reason that its life may be extended proportionately to the amount of the surface area that is covered by the plates, as while the belt is still subject to some extent to the contact of the oil, this extent is greatly limited by the presence of the plates.

While I have shown and described the specific construction of belt and plate and a specific arrangement of the plates on the belt, I do not wish to be understood as limiting myself to these specific details, as changes may be made therein without departing from the spirit of the invention.

Having thus described my invention what I claim as new therein and desire to secure by Letters-Patent, is:—

1. A belt comprising a flexible band and metallic members carried by said band comprising head portions exposed on the outer surface of the band and arranged in close relation throughout the length thereof to provide armor for the outer surface of the band.

2. A belt comprising a flexible band and metallic members carried by said band, comprising head portions exposed in close relation on the outer surface of the band to substantially cover said surface, but spaced sufficiently to permit the band to flex.

3. A belt comprising a flexible band and metallic members carried by said band, comprising head portions arranged transversely of the band and having attaching members integral with the head portions and projected through the band material; the head portions being arranged in close relation to substantially cover the band, but spaced sufficiently to allow the band to flex.

In testimony whereof I affix my signature.

GEORGE W. WEBB.